United States Patent [19]

Ward

[11] Patent Number: 5,016,843
[45] Date of Patent: May 21, 1991

[54] PIPE CLAMP

[75] Inventor: John F. Ward, Ontario, Canada

[73] Assignee: Canplas Industries Limited, Barrie, Canada

[21] Appl. No.: 522,398

[22] Filed: May 8, 1990

Related U.S. Application Data

[63] Continuation of Ser. No. 222,664, Jul. 21, 1988, abandoned.

[30] Foreign Application Priority Data

Jul. 8, 1988 [CA] Canada ................................ 572556

[51] Int. Cl.⁵ .............................................. F16L 3/22
[52] U.S. Cl. .................................. 248/68.1; 248/74.2; 174/4 R
[58] Field of Search ............................ 248/68.1, 74.2

[56] References Cited

U.S. PATENT DOCUMENTS

| D. 296,417 | 6/1988 | Misono et al. ............. | 248/74.2 X |
| 1,308,869 | 7/1919 | Rohmes ..................... | 248/69 |
| 1,365,626 | 1/1921 | Pleisker et al. ............ | 248/69 |
| 1,805,742 | 5/1931 | Reynolds .................... | 248/251 |
| 2,310,434 | 2/1943 | Hyman ....................... | 248/71 |
| 2,657,442 | 11/1953 | Bedford, Jr. ............... | 248/74.2 |
| 2,868,486 | 1/1959 | Poupitch .................... | 248/68.1 |
| 3,363,864 | 1/1968 | Olgreen ..................... | 248/68.1 |
| 4,671,537 | 6/1987 | Toshitsugu ................. | 248/74.2 |

FOREIGN PATENT DOCUMENTS

| 952505 | 8/1974 | Canada ...................... | 248/74.1 |
| 2439350 | 5/1980 | France ....................... | 248/68.1 |

Primary Examiner—Alvin C. Chin-Shue
Attorney, Agent, or Firm—Rogers, Bereskin & Parr

[57] ABSTRACT

A clamp is disclosed for securing pipe to a surface. The clamp comprises a body for retaining the pipe therein. The body has at least two ends and at least one of the ends is securable to the surface by a fastener. In one embodiment, the ends are in the form of outwardly extending flanges with preformed holes for fastening. The body also includes a clasp which is adapted to releasably secure an electrical wire to the clamp. In one embodiment the clasp is a resilient cantilever having a rest position and being biased towards said rest position upon being displaced therefrom.

6 Claims, 2 Drawing Sheets

PIPE CLAMP

This application is a continuation of application Ser. No. 07/222,664, filed July 21, 1988, now abandoned.

FIELD OF INVENTION

This invention relates to devices of the type that are used to support and secure pipes to surfaces. In particular, this invention relates to a pipe clamp of the type that may be used, among other things, to support pipes which form part of a central vacuum cleaning system.

BACKGROUND OF INVENTION

Central vacuum cleaning systems are common in residential and commercial buildings. In the typical central vacuum system a motorized vacuum unit is located in a remote part of a building. Airtight piping connects the central motorized unit with a number of terminal inlets which are normally wall-mounted. A flexible vacuum hose, capable of accomodating a variety of vacuum heads, can then be inserted into the terminal inlet. Suction is provided at the vacuum head when the central unit is switched on. Any materials picked up by the suction at the vacuum head are then drawn back through the piping system into a retaining receptacle at the central unit.

For convenience, some vacuum systems are designed so that the motorized vacuum unit is activited upon the insertion of the flexible hose into the terminal inlet. Typically, the terminal inlets have a circular opening into which the end of the flexible vacuum hose can be inserted. These openings are normally free of threaded portions or other fastening means and the hose is held in place by a friction fit and by the suction provided by the motorized unit. Situated on the inside of the circular opening are two spaced apart electrical contacts protruding slightly inward. An electrical wire connects each contact to opposing sides of a relay switching device located in the central motorized unit such that when an electrical circuit is completed between the contacts, the vacuum motor will start. In systems with numerous terminal inlets, the contacts are wired in parallel so that electrically connecting the contacts in any one inlet will start the vacuum motor.

Normally the end of the flexible vacuum hose which is insertable into the terminal inlet is made of conductive material so as to complete the electrical circuit between the two contacts. In this manner the system can be switched on by inserting the hose into the terminal inlet. Alternatively, the terminal inlet may be covered with a flap and a switch may be connected to the flap such that lifting the flap activates the central motorized unit.

The above described system requires the installation of suitable vacuum piping and electrical wires which connect the central motorized unit with the terminal inlets. Currently piping is held in place through the use of wires or pipe clamps which secure the pipe to floor joists, wall studs and the like. Typically the electrical wire is run along side of the pipe and either held tight against the pipe with the use of wires, ties or tape, or, the wire may be strapped independently to the surface over which the pipe is run. These methods have a number of drawbacks. It is often difficult to attach the electric wires and it can be time consuming. Further, because the electrical system needs to be tested prior to completing the wiring, it is often necessary to string up the wires, test the circuits, then go back and secure the wires in place. Replacement of the wire is also difficult and time consuming as each strap, wire, tie, or taped connection must be removed. Securing the wire by one of these means also requires the use of additional materials thereby increasing the cost of the installation.

SUMMARY OF THE INVENTION

The invention therefore provides a pipe clamp which overcomes these disadvantages by eliminating the necessity for separate materials to attach the wire, and by allowing the wire to be secured along side the pipe in such a manner that it can be easily removed or replaced.

Accordingly, the present invention in one of its aspects provides a clamp for securing pipe to a surface, said clamp comprising a body for retaining said pipe therein, having at least two ends, at least one of said ends being securable to said surface by a fastener, and a clasp adapted to releasably secure an electrical wire to said body.

In another aspect the invention provides in combination, a pipe, an electrical wire running along side said pipe, and a pipe clamp, said clamp comprising a body for retaining said pipe therein, having at least two ends with at least one flange extending radially outward from said ends, and a clasp for releasably securing said electrical wire.

Further objects and advantages of the invention will become apparent from the following description, taken together with the accompanying drawings.

BRIEF DESCRIPTION OF THE DRAWINGS

For a better understanding of the present invention, and to show more clearly how it may be carried into effect, reference will now be made, by way of example, to the accompanying drawings, which show the preferred embodiments of the present invention in which.

DESCRIPTION OF PREFERRED EMBODIMENT

Figure 1:
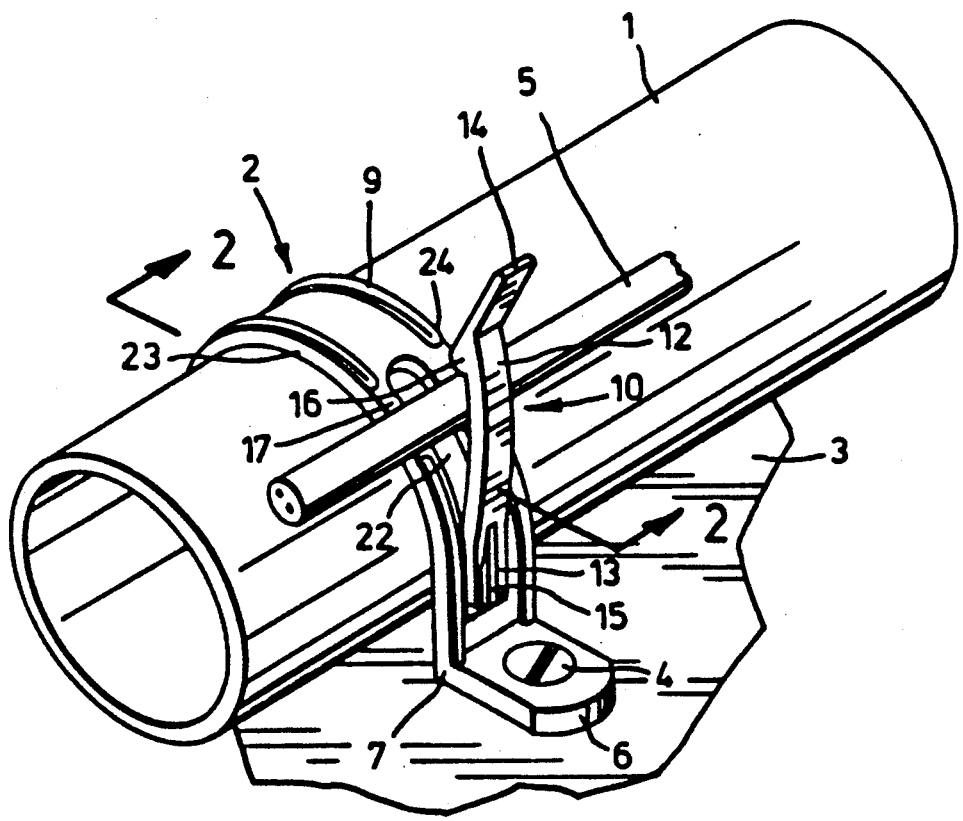
FIG. 1 is a perspective view of a pipe clamp according to the present invention.
Figure 2:
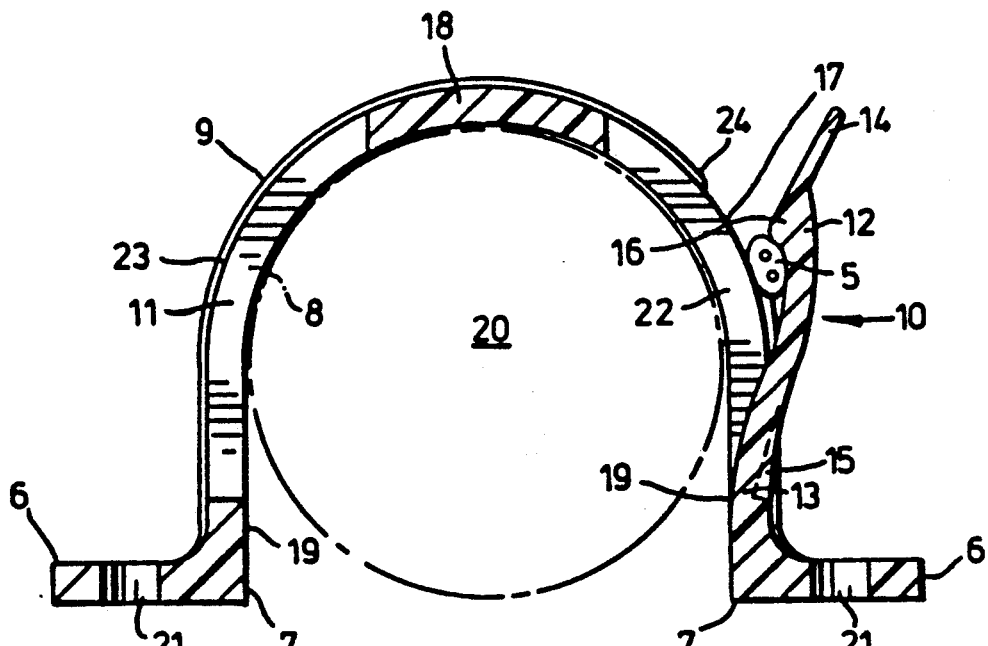
FIG. 2 is a cross-sectional view taken along the line 1—1 of the pipe clamp of FIG. 1.

FIG. 1 shows a typical rigid vaccum cleaning system pipe, generally indicated at 1, secured in place with a pipe clamp according to the present invention, denoted generally by 2. The clamp 2 has a body 23, for retaining the pipe 1, having at least two ends 7 (as shown in FIG. 2) with at least one end being securable to a surface 3 by a fastener 4 (shown in FIG. 1). The clamp 2 also includes a clasp 10 used to releasably secure an electrical wire 5 to the body 23 and along side the pipe 1.

The clamp 2 is formed of a flexible resilient plastic, such as poly-vinyl chloride, and is of a generally U-shaped cross-section with a smooth interior surface 8 as shown in FIG. 2. The clamp 2 has an upper semi-circular portion 18 bridging two generally vertical leg sections 19. The semi-circular portion 18 and the leg sections 19 define an opening 20 for accomodating the pipe 1 such that when fastened to the surface 3, the clamp 2 tightly secures the pipe 1 against the surface 3. Typically, the clamp 2 is used to secure the pipe 1 to the surface 3 which comprises either a joist, wall stud, or wall surface. However, where required the clamp 2 can be used to secure the pipe 1 to numerous other surfaces.

According to the present invention, the clamp 2 has outwardly extending flanges 6 attached to ends 7 of the generally vertical leg sections 19. The flanges 6 contain preformed holes 21 through which the fastener 4 can pass in order to secure the clamp 2 to the surface 3. In practice, the fastener 4 is normally a screw, nail, bolt or rivet which passes through the flange 4 into the surface 3. In some instances the clamp 2 may be secured through the application of adhesive to the under surface of the flange 4 gluing the clamp 2 to the surface 3. Still in another embodiment, the flanges 4 may be omitted and the ends 7 of the vertical legs 19 may be sharpened such that when force is applied to the clamp 2 the ends 7 penetrate the surface 3 thereby securing the clamp 2 to the surface 3.

When used in association with a central vacuum cleaning system, a first function of the clamp 2 is to secure the pipe 1 against the surface 3 with the aid of fasteners 4. A second function of the clamp 2 is to releasably secure the electrical wire 5 along side the pipe 1.

In order to releasably secure the electrical wire 5, the clasp 10 comprises a resilient cantilever configuration having a free end 12 and a fixed end 13. The clasp 10 has both a rest position (shown in FIG. 3) and a displaced position (shown in FIGS. 1 and 2). When displaced, the clasp 10 is biased toward its rest position. In the preferred embodiment, the natural resilience of the plastic, in combination with the cantileverial structure creates the biasing force. When in its rest position, the clasp 10 is coincident with a slot 22 in the clamp 2. The clasp 10 has a thickness lesser than that of the clamp body 23 and is curved inwardly for at least a portion of its length to generally follow the curvature of the body 23.

Figure 3:
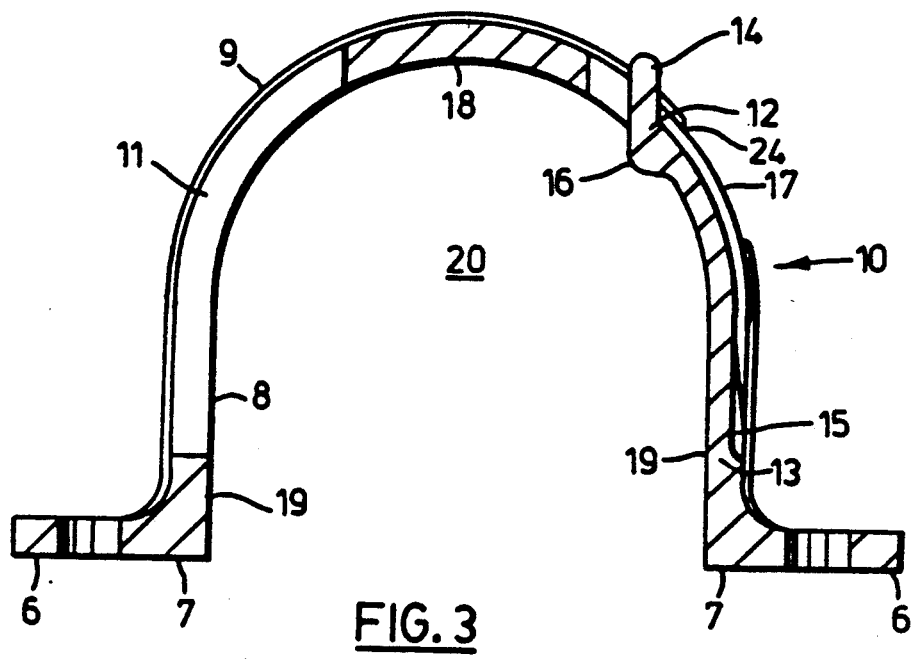
FIG. 3 is a cross-sectional view taken along the line 1—1 of the clamp shown in FIG. 1 with a clasp shown in a rest position.

Turning now to FIG. 3, and considering the clasp 10 in the rest position, the free end 12 of the clasp 10 includes a first protrusion 14 extending outwardly from the free end 12 and from the body 23. The first protrusion 14 can be grasped by a thumb or finger allowing the clasp 10 to be manually actuated from its rest position to its displaced position. The free end 12 also has a second protrusion 16 extending inwardly from the free end 12 into the opening 20. The second protrusion 16 hinders the electrical wire 5 from sliding out from between the clasp 10 and the clamp body 23 when the electrical wire 5 is placed between the clasp 10 and the clamp body 23 and the clasp 10 is released.

The tendency of the clasp 10 to return to its rest position, when displaced, is enhanced through the use of a stiffening ridge 15 located at the fixed end 13 of the clasp 10. It will be noted that the stiffening ridge 15 is located on an outer surface of the fixed end 13 of the clasp 10, and forms part of the junction of the clasp 10 and the clamp body 23. When the clasp 10 is displaced from its rest position, the stiffening ridge 15 is put into compression thereby increasing the force by which the clasp 10 releasably secures the electrical wire 5. It will be appreciated by those skilled in the art that the stiffening ridge 15 could also be located on the inner surface of the clasp 10. In such a case, the restorative force created upon displacement of the clasp 10 to the displaced position would be due to the stiffening ridge 15 being put under tensile loading and due to the resiliency of the clasp 10.

The clamp 2 also contains strengthening ribs 9 arranged circumferentially about the outer surface of the clamp 2. The ribs 9 subside adjacent to the free end 12 of the clasp 10 providing a smooth surface 17 against which the electrical wire 5 is releasably secured. The subsidance of these ribs 9 also creates an edge 24 on the outer surface of the body 23 which also could hinder the tendency of the electrical wire 5 to slip out from between the clasp 10 and the body 23.

The clamp 2 also includes a material saving opening 11 located opposite the slot 22 and the clasp 10. As will be appreciated by those skilled in the art, the amount of material required to form the body 23 can be reduced through the use of such an opening where permissible in view of strength considerations and the like.

In use, the clamp 2 is constructed so that the opening 20 defined by the semi-circular portion 18 bridging the two generally vertical leg sections 19 is only slightly larger than the outside diameter of the pipe 1. The clamp 2 is placed over the pipe 1 and secured to the surface 3 with the fasteners 4. The electrical wire 5, running along side the pipe 1, is releasably secured between the clasp 10 and the clamp body 23 bearing against the smooth surface 17. To releasably secure the electrical wire 5, the first protrusion 14 is grasped allowing the clasp 10 to be displaced from its rest position such that the electrical wire 5 can be inserted between the clasp 10 and the clamp body 23. The combination of the resiliency of the clasp 10 and the action of the stiffening ridge 15 ensure the electrical wire 5 is held tightly in place.

In practice, a number of clamps 2 are installed on the pipes 1 of a central vacuum cleaning system. It will be appreciated that use of the clamp 2 not only provides a means for securing the pipe 1 but also removes the need to use other means to fasten the electrical wire 5. Installation of the pipe 1 and the electrical wire 5 will accordingly be fast and efficient due to a minimal amount of labour required and the fact that additional fastening means for the wire 5 are not required. As well, the clamp 2 in one embodiment is preferably moulded from a resilient plastic material and is therefore relatively inexpensive and easy to manufacture.

Another advantage of the clamp 2 is the fact that the electrical wire 5 which has been releasably secured can be easily and quickly removed. That is, the clasp 10 is primarily elastically displaced, rather than being non-elastically deformed, and consequently the clasp 10 can be actuated, and the electrical wire 5 can be inserted and removed many times over. Further, the size and shape of the electrical wire 5 does not limit the use of the clamp 2 as the clasp 10 can be displaced to hold wires of many various cross-sectional shapes and sizes. It is also possible to secure more than one wire at one time.

It will also be apparent to those skilled in the art that when held by the clasp 10 the electrical wire 5 is strain relieved to some extent such that if the wire is accidentally pulled for example, the clamp 2 bears the force and not the electrical connections at the end of the electrical wire 5. The strain relief effect is of course enhanced by increasing the number of clasps the electrical wire 5 is secured within.

It is to be understood that what has been described are the preferred embodiments of the invention and it is possible to make variations to these embodiments while staying within the broad scope of the invention. Some of these have been discussed above and others will be apparent to those skilled in the art to which this invention pertains. For example, while reference has been made to the clamp 2 being made from plastic, it could also be suitably made from metal or the like. Also, while the preferred embodiment shows two flanges 6 for fastening the clamp 2 to a surface 3, in some instances, only one may be required.

I claim:

1. A clamp for simultaneously securing a pipe to a surface and releasably securing at least one following electrical wire, said clamp comprising:

a u-shaped body for retaining said pipe therein, said u-shaped body in cross-section having a semi-circular portion, ending in two straight portions having opposed outwardly extending feet, the length of each straight portion being at least equal to the radius of the semi-circular portion, said straight portions and said feet forming L-shaped ends for securing said body to a surface, said body having reinforcing ribs and opposed material saving openings and a clasp disposed in one of said openings said clasp comprising a resilient cantilever having a profile corresponding to the profile of the u-shaped body, whereby in a rest position said cantilever is coincident with said u-shaped body, within said opening, and in a displaced position said cantilever is displaced outwardly from said opening and is biased towards said rest position, said clasp including a first protrusion extending outwardly from said clasp and outwardly from an outer surface of said u-shaped body said first protrusion allowing said clasp to be manually actuable from said rest position to said displaced position and means for retaining said electrical wire between said clasp and said u-shaped body said retaining means comprising a second protrusion adjacent a free end of said cantilever and projecting inwardly generally towards a centre of said u-shaped body and a relieved portion extending past said second protrusion in said reinforcing ribs to retain said wire between said clasp and said u-shaped body, both the first and second protrusions extending beyond the profile of the u-shaped body when the cantilever is in the rest position, said clamp, in use retaining said pipe within said u-shaped body, securing said pipe to a surface and releasably securing and at least partially strain relieving said following wire between said clasp and said outer surface of said u-shaped body.

2. A clamp as claimed in claim 1 wherein said clasp includes a stiffening ridge located adjacent a fixed end of said cantilever for enhancing the tendency of the clasp to return to its rest position.

3. A clamp as claimed in claim 2 wherein said stiffening ridge is located on an outer face at a fixed end of said cantilever, said stiffening ridge forming part of the junction of the cantilever and the clamp body, and being compressed when said clasp is actuated to said displaced position.

4. A clamp as claimed in claim 1 or 3 wherein said body has a smooth interior surface.

5. A clamp as claimed in claim 1 or 3 wherein said cantilever has a thickness lesser than that of the clamp body and is curved inwardly for at least a portion of its length.

6. A clamp as claimed in claims 1 or 3 wherein said body and said clasp are integrally molded from a flexible resilient plastic material.

* * * * *